US011212828B2

(12) United States Patent
Gupta et al.

(10) Patent No.: US 11,212,828 B2
(45) Date of Patent: Dec. 28, 2021

(54) APPENDING AN ON-DEMAND GRANT TO A SEMI-PERSISTENT SCHEDULING (SPS) GRANT

(71) Applicant: QUALCOMM Incorporated, San Diego, CA (US)

(72) Inventors: Piyush Gupta, Bridgewater, NJ (US); Junyi Li, Chester, NJ (US); Chong Li, Weehawken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 16/360,950

(22) Filed: Mar. 21, 2019

(65) Prior Publication Data

US 2019/0313439 A1 Oct. 10, 2019

Related U.S. Application Data

(60) Provisional application No. 62/653,489, filed on Apr. 5, 2018.

(51) Int. Cl.
*H04W 72/14* (2009.01)
*H04B 7/06* (2006.01)
(Continued)

(52) U.S. Cl.
CPC .......... *H04W 72/14* (2013.01); *H04B 7/0413* (2013.01); *H04B 7/0626* (2013.01);
(Continued)

(58) Field of Classification Search
CPC ................................... H04W 72/14
See application file for complete search history.

(56) References Cited

U.S. PATENT DOCUMENTS

2013/0039272 A1* 2/2013 Chen .................. H04W 72/042
370/328
2013/0223299 A1* 8/2013 Yang .................... H04L 1/1812
370/280
(Continued)

FOREIGN PATENT DOCUMENTS

WO 2010019806 A1 2/2010
WO WO-2010019806 A1 * 2/2010 ........ H04W 72/1242
(Continued)

OTHER PUBLICATIONS

International Search Report and Written Opinion—PCT/US2019/023662—ISA/EPO—dated May 31, 2019 (182682WO).

*Primary Examiner* — Kodzovi Acolatse
*Assistant Examiner* — Abdeltif Ajid
(74) *Attorney, Agent, or Firm* — Harrity & Harrity LLP/Qualcomm Incorporated

(57) ABSTRACT

Various aspects of the present disclosure generally relate to wireless communication. A traffic window may be scheduled for a user equipment (UE) base on semi-persistent scheduling (SPS). In various situations, all or a portion of a first communication to be transmitted or received can be transmitted or received during an SPS grant in the traffic window. If useful, additionally, a remainder of the first communication not transmitted or received during the SPS grant may be transmitted in an on-demand grant appended to the SPS grant. The on-demand grant can be in a same subframe as the SPS grant. When the BS appends the on-demand grant to the SPS grant, the BS may transmit, and the UE may receive, an indicator indicating that the on-demand grant has been appended to the SPS grant. Numerous other aspects are provided.

29 Claims, 14 Drawing Sheets

(51) Int. Cl.
*H04W 72/04* (2009.01)
*H04W 72/12* (2009.01)
*H04W 88/06* (2009.01)
*H04B 7/0413* (2017.01)

(52) U.S. Cl.
CPC ... *H04W 72/0446* (2013.01); *H04W 72/1231* (2013.01); *H04W 72/1289* (2013.01); *H04W 88/06* (2013.01)

(56) References Cited

U.S. PATENT DOCUMENTS

| | | | |
|---|---|---|---|
| 2014/0369242 A1* | 12/2014 | Ng | H04L 5/001 370/280 |
| 2017/0265183 A1* | 9/2017 | Chen | H04W 72/10 |
| 2020/0067584 A1* | 2/2020 | Kang | H04L 5/0082 |
| 2020/0205176 A1* | 6/2020 | Yu | H04W 72/042 |
| 2021/0212088 A1* | 7/2021 | Lee | H04W 72/12 |

FOREIGN PATENT DOCUMENTS

| | | |
|---|---|---|
| WO | 2016029352 A1 | 3/2016 |
| WO | 2017204734 A1 | 11/2017 |

* cited by examiner

APPENDING AN ON-DEMAND GRANT TO A SEMI-PERSISTENT SCHEDULING (SPS) GRANT

CROSS REFERENCE TO RELATED APPLICATION UNDER 35 U.S.C § 119

This application claims priority to U.S. Provisional Application No. 62/653,489, filed on Apr. 5, 2018, entitled "TECHNIQUES AND APPARATUSES FOR APPENDING ON-DEMAND GRANT TO A SEMI-PERSISTENT SCHEDULING (SPS) GRANT," which is hereby expressly incorporated by reference herein.

FIELD OF THE DISCLOSURE

Aspects of the present disclosure generally relate to wireless communication, and more particularly to appending an on-demand grant to a semi-persistent (SPS) grant.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, further improvements in LTE and NR technologies, particularly as regards the reliability of transmissions, continue to receive attention. Preferably, these improvements should be applicable to other multiple access technologies and the telecommunication standards that employ these technologies.

SUMMARY

In some aspects, a method for wireless communication, performed by a base station (B S), may include transmitting an indicator indicating that an on-demand grant is appended to a semi-persistent scheduling (SPS) grant for a first communication of a traffic window scheduled for a user equipment (UE) using SPS, wherein the on-demand grant is in a same subframe as the SPS grant.

In some aspects, a base station for wireless communication may include one or more processors configured to transmit an indicator indicating that an on-demand grant is appended to a semi-persistent scheduling (SPS) grant for a first communication of a traffic window scheduled for a user equipment (UE) using SPS, wherein the on-demand grant is in a same subframe as the SPS grant.

In some aspects, a non-transitory computer-readable medium may store one or more instructions for wireless communication. The one or more instructions, when executed by one or more processors of a base station, may cause the one or more processors to transmit an indicator indicating that an on-demand grant is appended to a semi-persistent scheduling (SPS) grant for a first communication of a traffic window scheduled for a user equipment (UE) using SPS, wherein the on-demand grant is in a same subframe as the SPS grant.

In some aspects, an apparatus for wireless communication may include means for transmitting an indicator indicating that an on-demand grant is appended to a semi-persistent scheduling (SPS) grant for a first communication of a traffic window scheduled for the apparatus using SPS, wherein the on-demand grant is in a same subframe as the SPS grant. In some aspects, a method for wireless communication, performed by a user equipment (UE), may include receiving, from a base station (BS), an indicator indicating that the BS has appended an on-demand grant to a semi-persistent scheduling (SPS) grant for a first communication of a traffic window scheduled for the UE using SPS, wherein the on-demand grant is in a same subframe as the SPS grant.

In some aspects, a user equipment for wireless communication may include a memory and one or more processors coupled to the memory. The memory and the one or more processors may be configured to receive, from a base station (BS), an indicator indicating that the BS has appended an on-demand grant to a semi-persistent scheduling (SPS) grant for a first communication of a traffic window scheduled for the UE using SPS, wherein the on-demand grant is in a same subframe as the SPS grant.

In some aspects, a non-transitory computer-readable medium may store one or more instructions for wireless communication. The one or more instructions, when executed by one or more processors of a user equipment (UE), may cause the one or more processors to receive, from a base station (BS), an indicator indicating that the BS has appended an on-demand grant to a semi-persistent scheduling (SPS) grant for a first communication of a traffic window scheduled for the UE using SPS, wherein the on-demand grant is in a same subframe as the SPS grant.

In some aspects, an apparatus for wireless communication may include means for receiving, from a base station (BS), an indicator indicating that the BS has appended an on-demand grant to a semi-persistent scheduling (SPS) grant for a first communication of a traffic window scheduled for the apparatus using SPS, wherein the on-demand grant is in a same subframe as the SPS grant.

In some aspects, a user equipment for wireless communication may include a memory and one or more processors coupled to the memory. The memory and the one or more processors may be configured to receive a transmission from a base station (BS), the transmission including an indicator indicating that the BS has appended an on-demand grant to a semi-persistent scheduling (SPS) grant for a first communication of a traffic window scheduled for the UE using SPS, wherein the on-demand grant is in a same subframe as the SPS grant.

Aspects generally include a method, apparatus, system, computer program product, non-transitory computer-readable medium, user equipment, base station, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
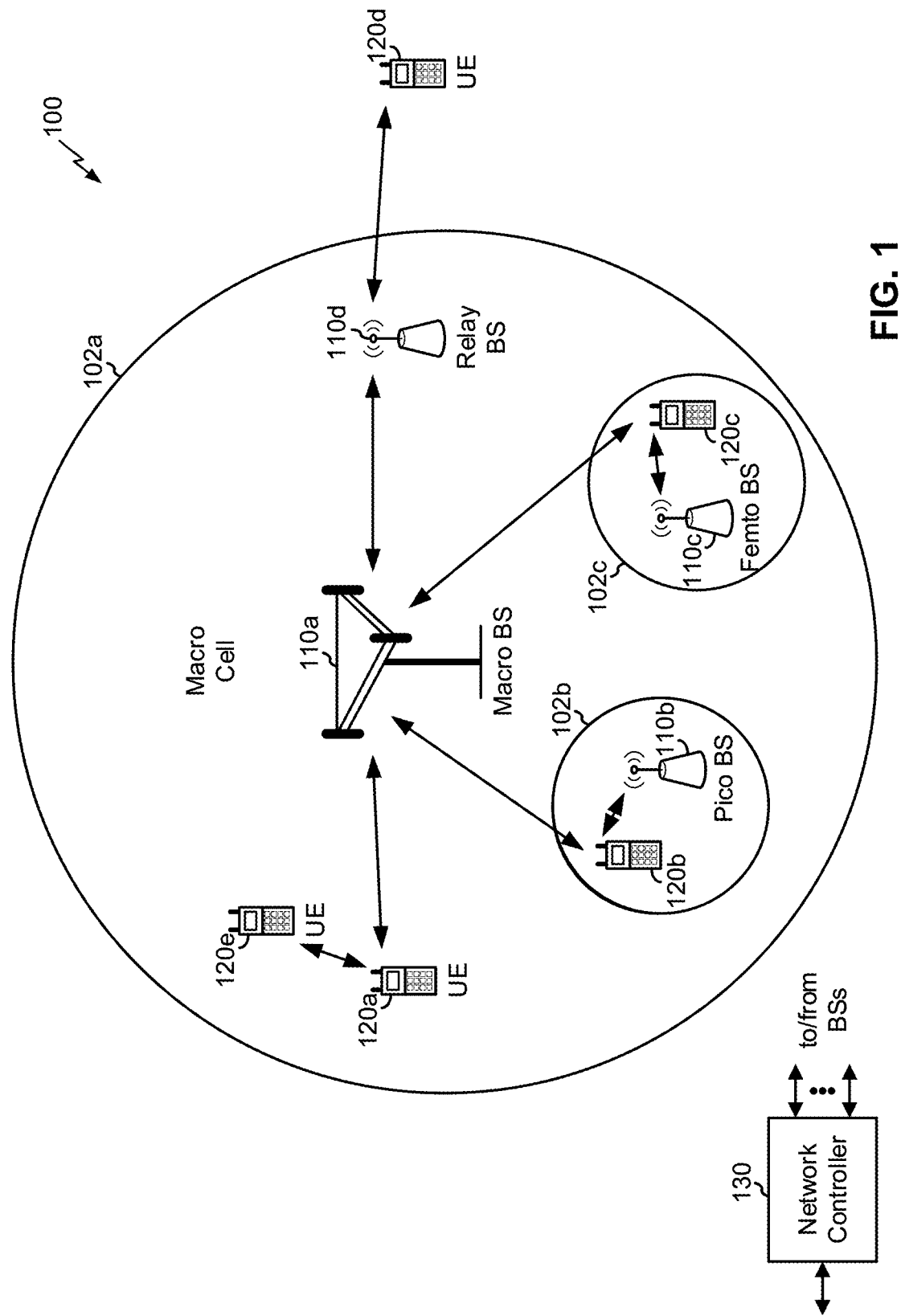
FIG. 1 is a block diagram conceptually illustrating an example of a wireless communication network, in accordance with various aspects of the present disclosure.

In a factory automation system, coordinated multipoint (CoMP) techniques may be implemented to improve outage capacity and/or reliability of communication within the factory automation system. In some instances, reliability is improved through spatial diversity. For example, multiple transmit receive points (TRPs) (e.g., programmable logic controllers (PLCs)) may be spatially (e.g., physically) distributed throughout a factory automation system to enable a management system to communicate, via the TRPs from various locations, with one or more user equipment (UE) (e.g., sensors, actuators, and/or the like) throughout the factory automation system. As such, the spatial diversity can be scaled to combat shadowing (e.g., when one or more devices, objects, or structures are present within a communication path between the UE and one or more of the TRPs). Accordingly, through multiple TRPs, the management system may use coordinated transmissions to the UE to attempt to ensure that mission-critical traffic is received, from the one or more TRPs, by the UE.

Some aspects of the present disclosure provide efficient resource allocation for mission-critical traffic in factory automation. In some instances, the mission-critical traffic is periodic and corresponds to cyclic exchanges between UEs and TRPs. Given the periodicity of the mission-critical traffic, a first communication (e.g., an initial transmission of one or more subsequent communications) of a transmission window may be sent according to a semi-persistent scheduling (SPS) established for a UE. As such, in previous techniques, for the first communication, TRPs may not use a physical downlink control channel (PDCCH), as the previous techniques rely on the reliability of the SPS. A retransmission may occur if acknowledgement/non-acknowledgement (ACK/NACK) feedback from the UE indicates that the first communication was not received. In some instances, the UE may send channel state information (CSI) to the TRPs to indicate a status of the channel used for communication between the UE and the one or more TRPs.

Some aspects of the present disclosure utilize CSI (or updated CSI) that is received before a traffic window to determine whether an SPS grant associated with the SPS for the UE is sufficient to achieve a threshold reliability for a first communication of the traffic window. According to some aspects described herein, if a TRP determines that the SPS grant is not sufficient to successfully transmit the first communication (e.g., that the SPS grant does not include a number of resource blocks sufficient to carry the first communication), the TRP may send an indicator (e.g., an updated PDCCH) that indicates one or more additional resources (which may be referred to herein as an "on-demand grant") for the first communication. According to some aspects, the one or more additional resources are appended to the SPS grant. This differs from prior techniques via which the SPS grant was overridden (e.g., replaced with another SPS grant that provides sufficient resources). In other words, the aspects described herein allow the one or more additional resources to be appended to the SPS grant as opposed to overriding the SPS grant with another SPS grant. As such, if the indicator is not successfully received, the UE may still receive at least a portion of the first communication via the SPS grant.

Accordingly, through use and indication of an on-demand grant (e.g., based on a determination that an SPS grant is not sufficient to successfully transmit a communication) reliability in a factory automation system is increased relative to previous techniques. Furthermore, through the use and indication of the on-demand grant, resources (e.g., power resources, processing resources, network resources, hardware resources, and/or the like) are conserved that may otherwise be consumed due to low reliability and/or lost data associated with previous communications between TRPs and UEs in the factory automation system. For example, power resources and/or processing resources may be conserved by avoiding the powering and/or execution of code of the management system, TRPs, and/or UEs to recover the lost data (e.g., when the SPS grant is not sufficient to successfully transmit the communication). Additionally, or alternatively, network resources may be conserved by avoiding the retransmissions of data (e.g., due to failed transmissions, lost data, and/or the like). Further, through the use and indication of the on-demand grant, hardware resources may be conserved (e.g., by avoiding the replacement of damaged devices, UEs, and/or the like as a result of the low reliability and/or lost data).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a TRP (e.g., a PLC of a factory automation system), and/or the like. Each BS may provide communication coverage for a particular geographic area. In 3GPP, the term "cell" can refer to a coverage area of a BS and/or a BS subsystem serving this coverage area, depending on the context in which the term is used. According to some aspects, the network 100 may be a network of a factory automation system, as described herein.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS, a TRP, or a UE) and send a transmission of the data to a downstream station (e.g., a UE, a TRP, or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a device of a factory automation system (e.g., a work station, a sensor, an actuator, and/or the like), etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources (e.g., SPS grants, on-demand grants, and/or the like) allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
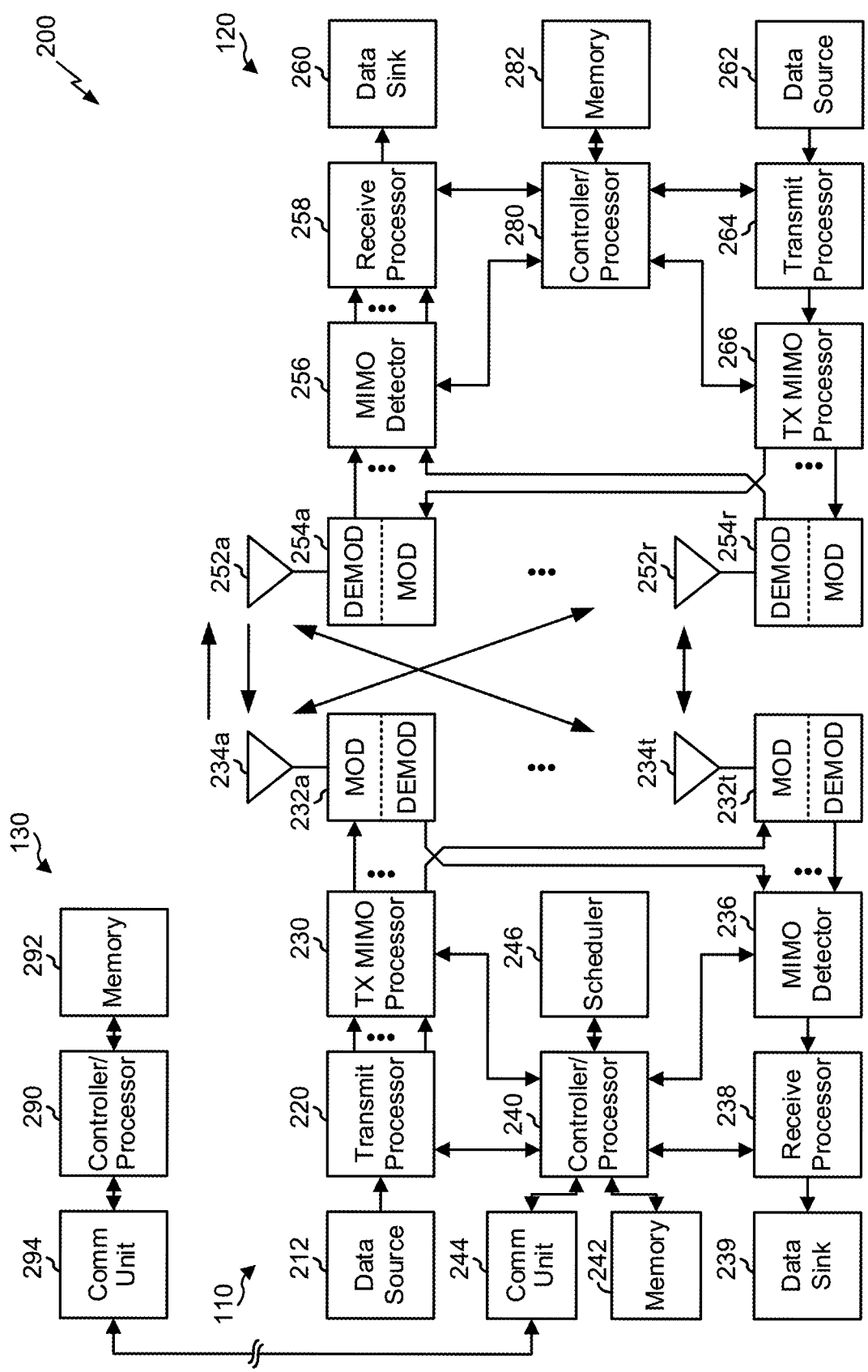
FIG. 2 is a block diagram conceptually illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with appending an on-demand grant to an SPS grant for a communication of a traffic window, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12A, process 1250 of FIG. 12B, and/or other processes as described herein. Memories 242 and 282 may store data and program codes for base station 110 and UE 120, respectively. A scheduler 246 may schedule UEs for data transmission on the downlink and/or uplink.

Figure 11:
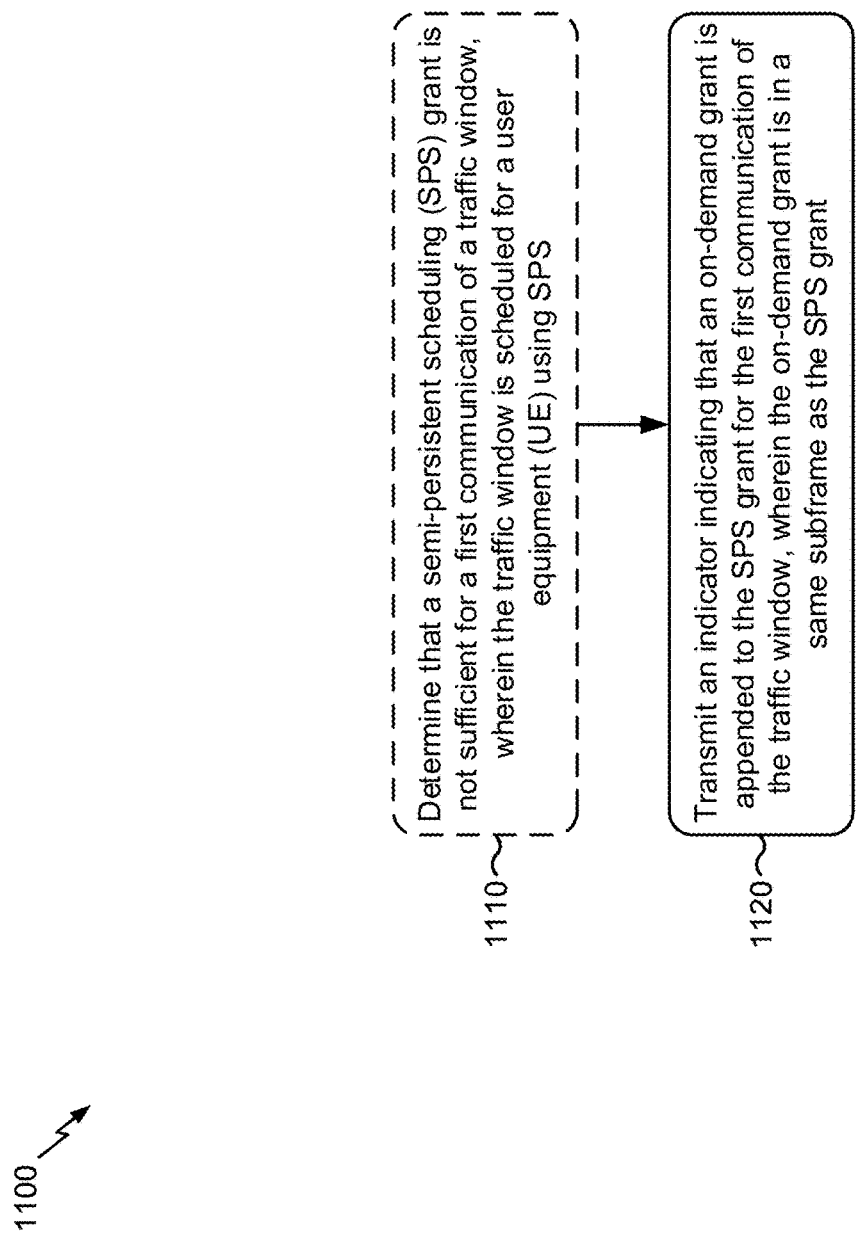
FIG. 11 is a diagram illustrating an example process performed, for example, by a base station, in accordance with various aspects of the present disclosure.

The stored program codes, when executed by processor 240 and/or other processors and modules at base station 110, may cause the base station 110 to perform operations described with respect to process 1100 of FIG. 11 and/or other processes as described herein. The stored program codes, when executed by processor 280 and/or other processors and modules at UE 120, may cause the UE 120 to perform operations described with respect to process 1200 of FIG. 12A, process 1250 of FIG. 12B, and/or other processes as described herein. A scheduler 246 may schedule UEs for data transmission on the downlink and/or uplink.

In some aspects, base station 110 may include means for determining that a semi-persistent scheduling (SPS) grant is not sufficient for a first communication of a traffic window, wherein the traffic window is scheduled for a user equipment (UE) using SPS; means for appending an on-demand grant to the SPS grant for the first communication of the traffic window, wherein the on-demand grant is in a same subframe as the SPS grant; and/or the like. In some aspects, such means may include one or more components of base station 110 described in connection with FIG. 2.

In some aspects, UE 120 may include means for providing channel state information (CSI) to a base station (BS) in association with a traffic window, wherein the UE is configured to receive (i.e., capable of receiving), from the BS, a first communication during the traffic window via a semi-persistent scheduling (SPS) grant; means for determining, based at least in part on an indicator in a PDCCH, that an on-demand grant has been appended to the SPS grant for the first communication, wherein the on-demand grant is in a same subframe as the SPS grant; and/or the like. In some aspects, such means may include one or more components of UE 120 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided merely as an example. Other examples may differ from what is described with regard to FIG. 2.

Figure 3A:
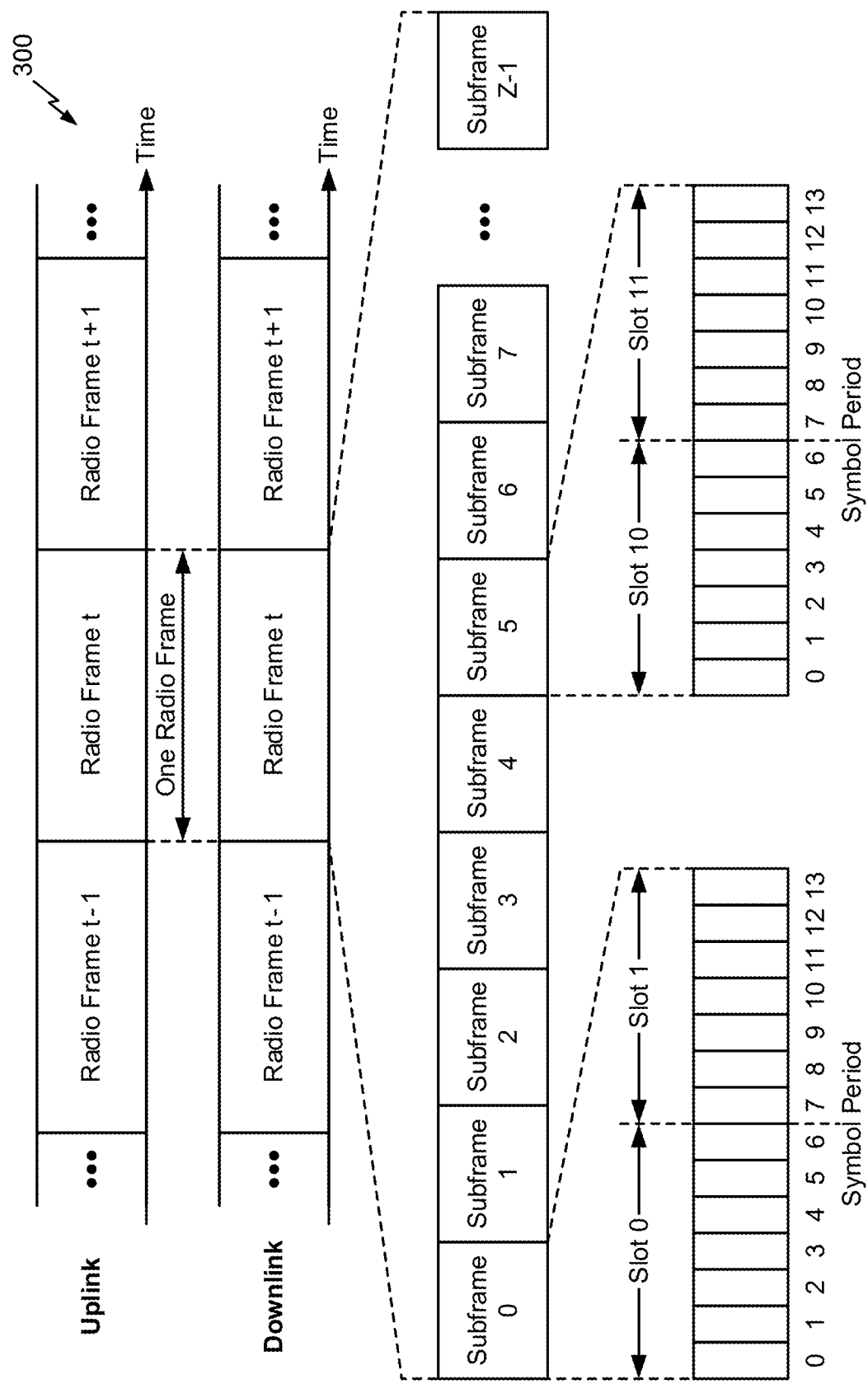
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z-1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L-1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
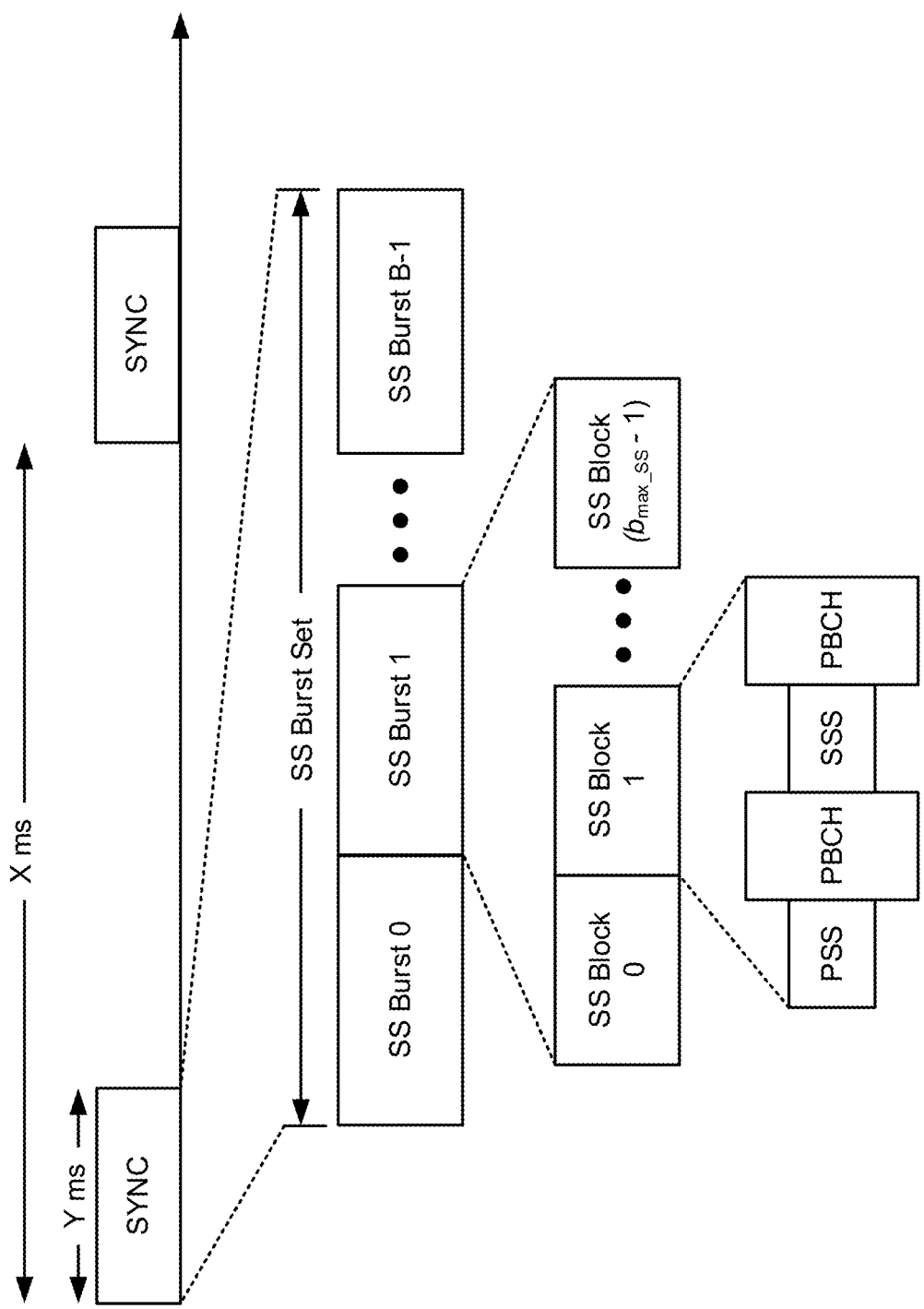
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\ SS-1}$), where $b_{max\ SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, a synchronization communication (e.g., an SS block) may include a base station synchronization communication for transmission, which may be referred to as a Tx BS-SS, a Tx gNB-SS, and/or the like. In some aspects, a synchronization communication (e.g., an SS block) may include a base station synchronization communication for reception, which may be referred to as an Rx BS-SS, an Rx gNB-SS, and/or the like. In some aspects, a synchronization communication (e.g., an SS block) may include a user equipment synchronization communication for transmission, which may be referred to as a Tx UE-SS, a Tx NR-SS, and/or the like. A base station synchronization communication (e.g., for transmission by a first base station and reception by a second base station) may be configured for synchronization between base stations, and a user equipment synchronization communication (e.g., for transmission by a base station and reception by a user equipment) may be configured for synchronization between a base station and a user equipment.

In some aspects, a base station synchronization communication may include different information than a user equipment synchronization communication. For example, one or more base stations synchronization communications may exclude PBCH communications. Additionally, or alternatively, a base station synchronization communication and a user equipment synchronization communication may differ with respect to one or more of a time resource used for transmission or reception of the synchronization communication, a frequency resource used for transmission or reception of the synchronization communication, a periodicity of the synchronization communication, a waveform of the synchronization communication, a beamforming parameter used for transmission or reception of the synchronization communication, and/or the like.

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a PDCCH in C symbol periods of a subframe, where B may be configurable for each subframe. The base station may transmit traffic data and/or other data on the PDSCH in the remaining symbol periods of each subframe.

According to some aspects, an allocation of an on-demand grant may be indicated within the PDCCH and the PDSCH may include an SPS grant for a UE and the on-demand grant. As such, within a same subframe, the on-demand grant can be appended to the SPS grant.

As indicated above, FIGS. 3A and 3B are provided as examples. Other examples may differ from what is described with regard to FIGS. 3A and 3B.

Figure 4:
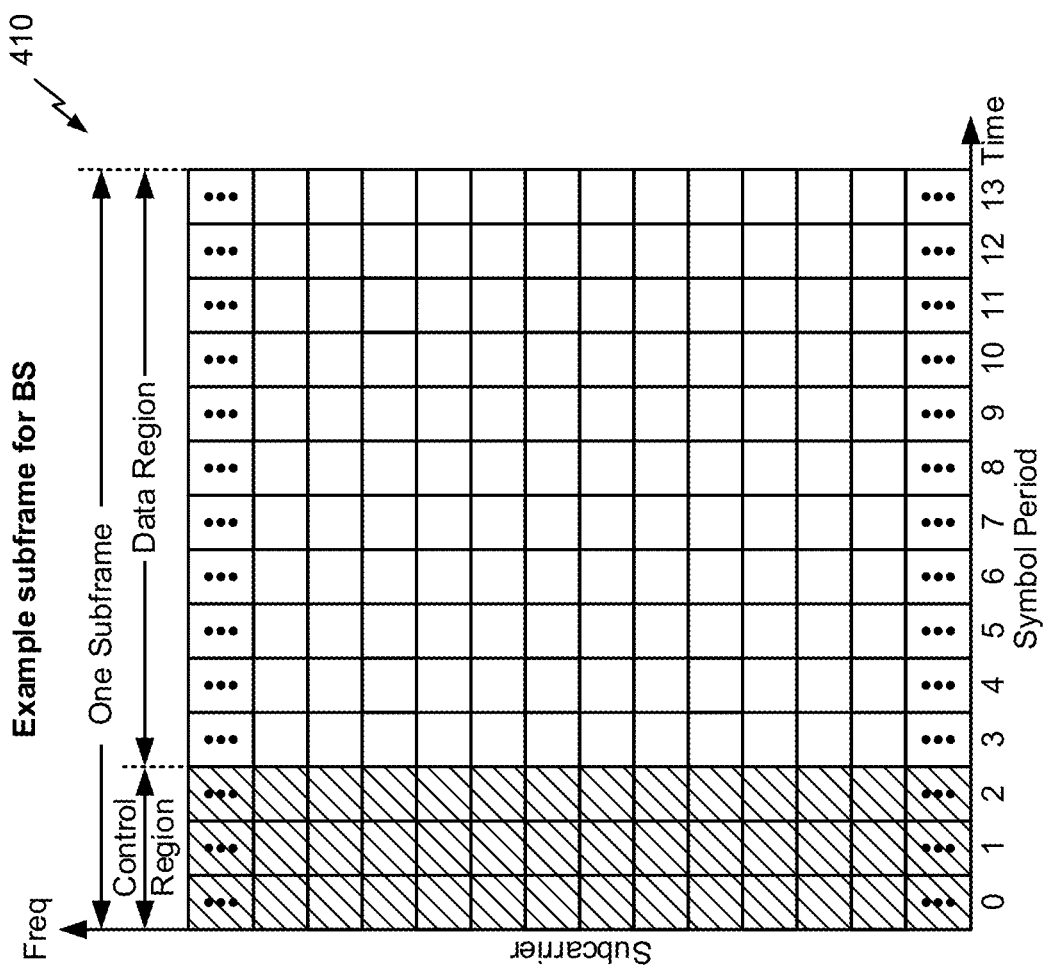
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

In some aspects, the example subframe format 410 may be divided into and/or may include one or more pools of resources. For example, a first pool of resources may be designated for SPS grants and a second pool of resources (which may or may not be non-overlapping with the first pool of resources) may be designated for on-demand grants that can be appended to one or more SPS grants.

As indicated above, FIG. 4 is provided as an example. Other examples may differ from what is described with regard to FIG. 4.

Figure 5:
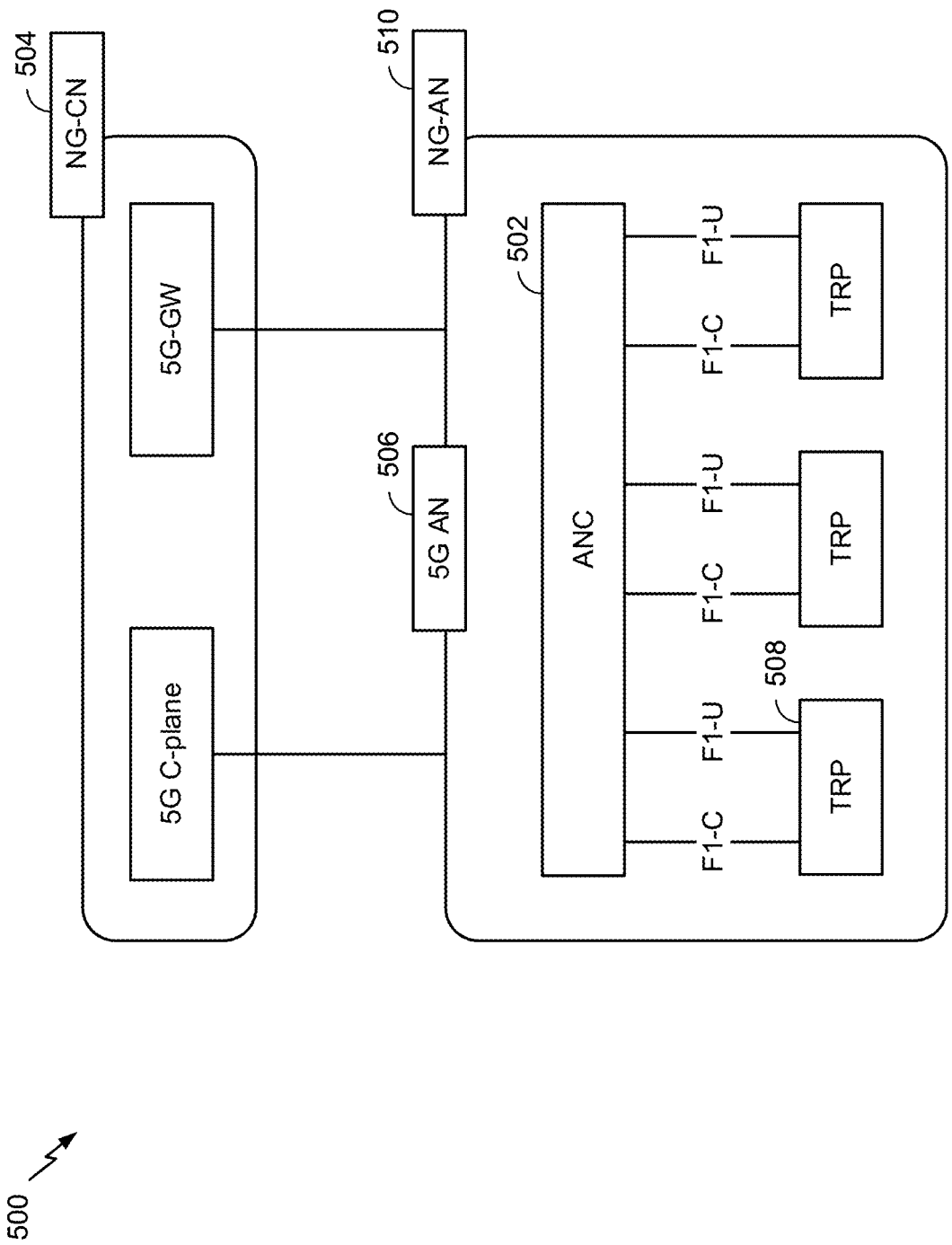
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. In some aspects, the example RAN 500 may be included within a factory automation system or may be a network of a factory automation system. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
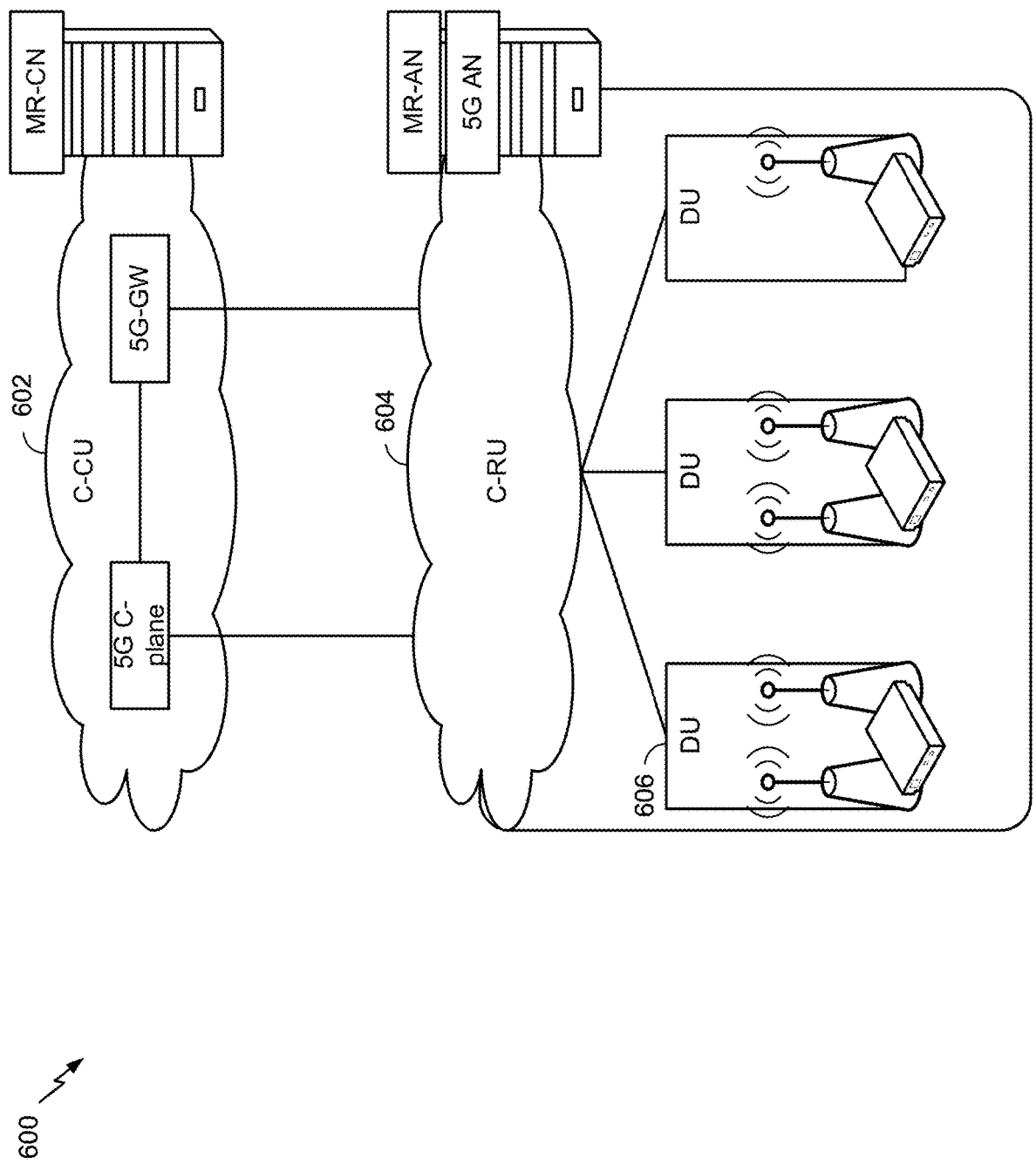
FIG. 6 illustrates an example physical architecture of a distributed RAN, in accordance with various aspects of the present disclosure.

FIG. 6 illustrates an example physical architecture of a distributed RAN 600, according to aspects of the present disclosure. In some aspects, the example distributed RAN 600 may be included within a factory automation system or may be a network of a factory automation system. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

Figure 7:
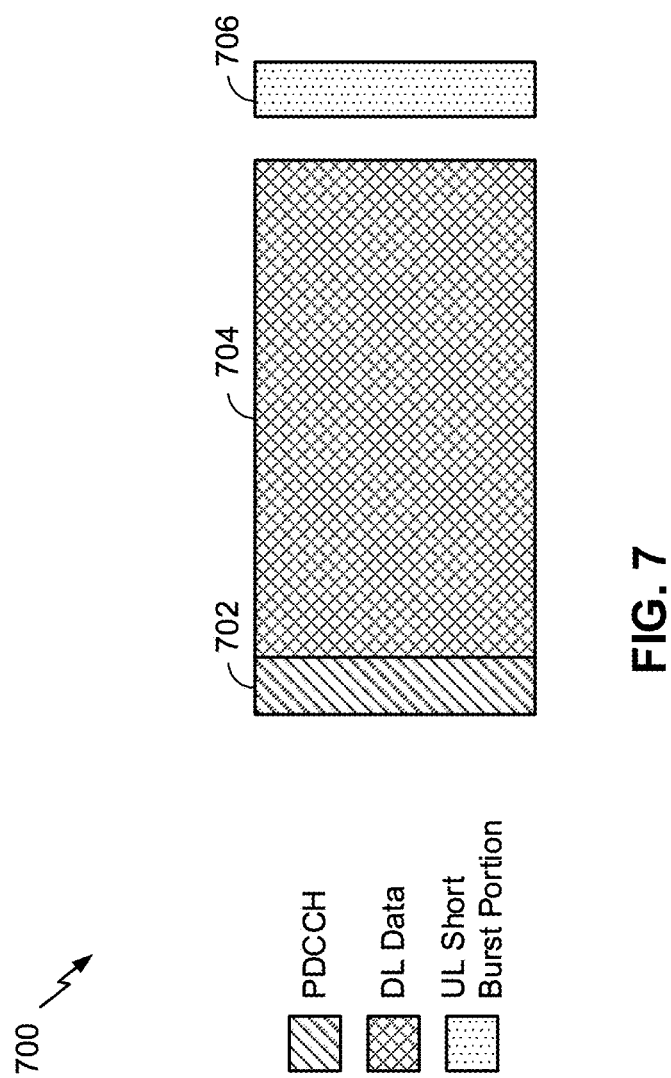
FIG. 7 is a diagram illustrating an example of a downlink (DL)-centric subframe, in accordance with various aspects of the present disclosure.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a PDCCH, as indicated in FIG. 7. In some aspects, the control portion 702 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, etc.), and/or the like. In some aspects, the PDCCH may indicate an on-demand grant that is to be appended to an SPS grant for a communication.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a PDSCH. In some aspects, the PDSCH may include SPS resources and/or on-demand resources. Accordingly, the PDSCH may include an on-demand grant (e.g., one or more on-demand resources) that is appended to an SPS grant (e.g., one or more SPS resources) according to an allocation indicated in the PDCCH, as will be described in greater detail further below with reference to FIG. 10.

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a physical uplink shared channel (PUSCH) ACK, an immediate ACK), a NACK signal (e.g., a PUCCH NACK, a PUSCH NACK, an immediate NACK), a scheduling request (SR), a buffer status report (BSR), a hybrid automatic repeat request (HARD) indicator, channel state information (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples may differ from what is described with regard to FIG. 7.

Figure 8:
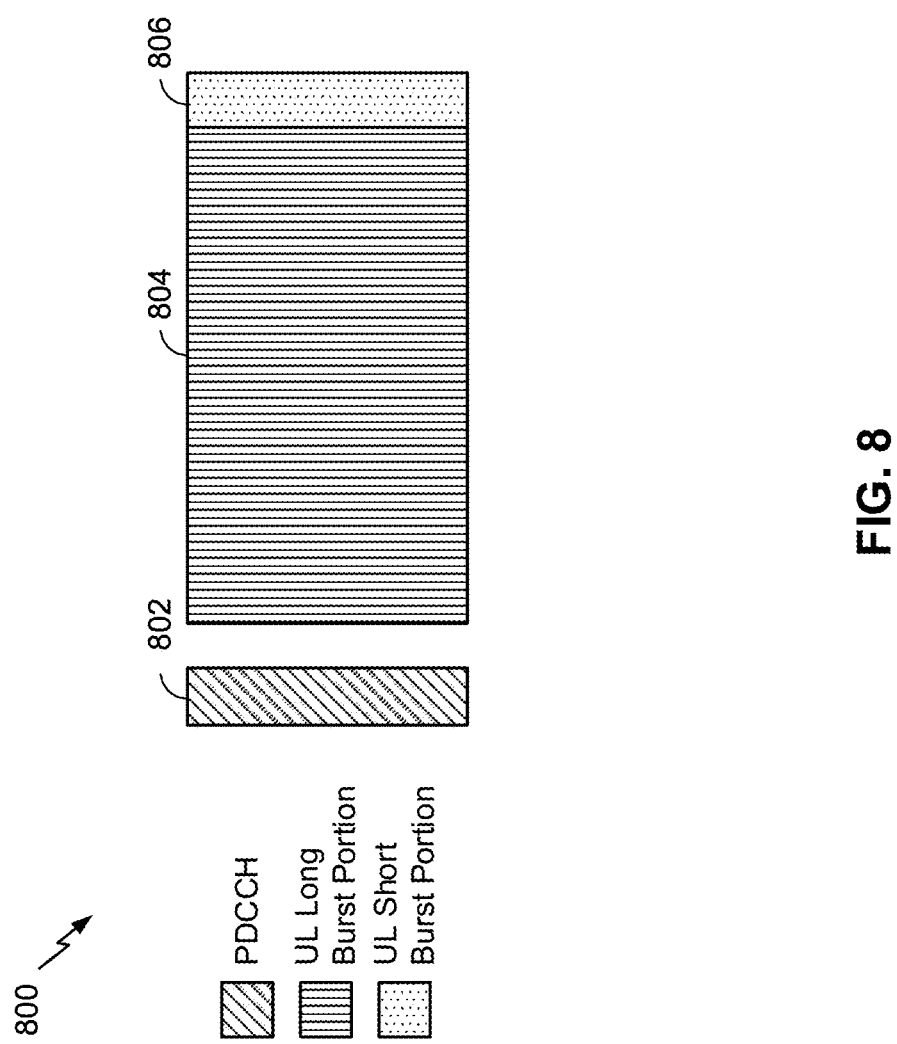
FIG. 8 is a diagram illustrating an example of an uplink (UL)-centric subframe, in accordance with various aspects of the present disclosure.

FIG. 8 is a diagram 800 showing an example of an UL-centric subframe or wireless communication structure. In some aspects, the UL-centric subframe may be used in association with a device of a factory automation (e.g., a sensor, an actuator, and/or the like) providing data, measurements, and/or information associated with the factory automation system to one or more TRPs (e.g., PLCs) of the factory automation system. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a PDCCH.

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7 and may include any of the information described above in connection with FIG. 7. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples may differ from what is described with regard to FIG. 8.

Figure 9:
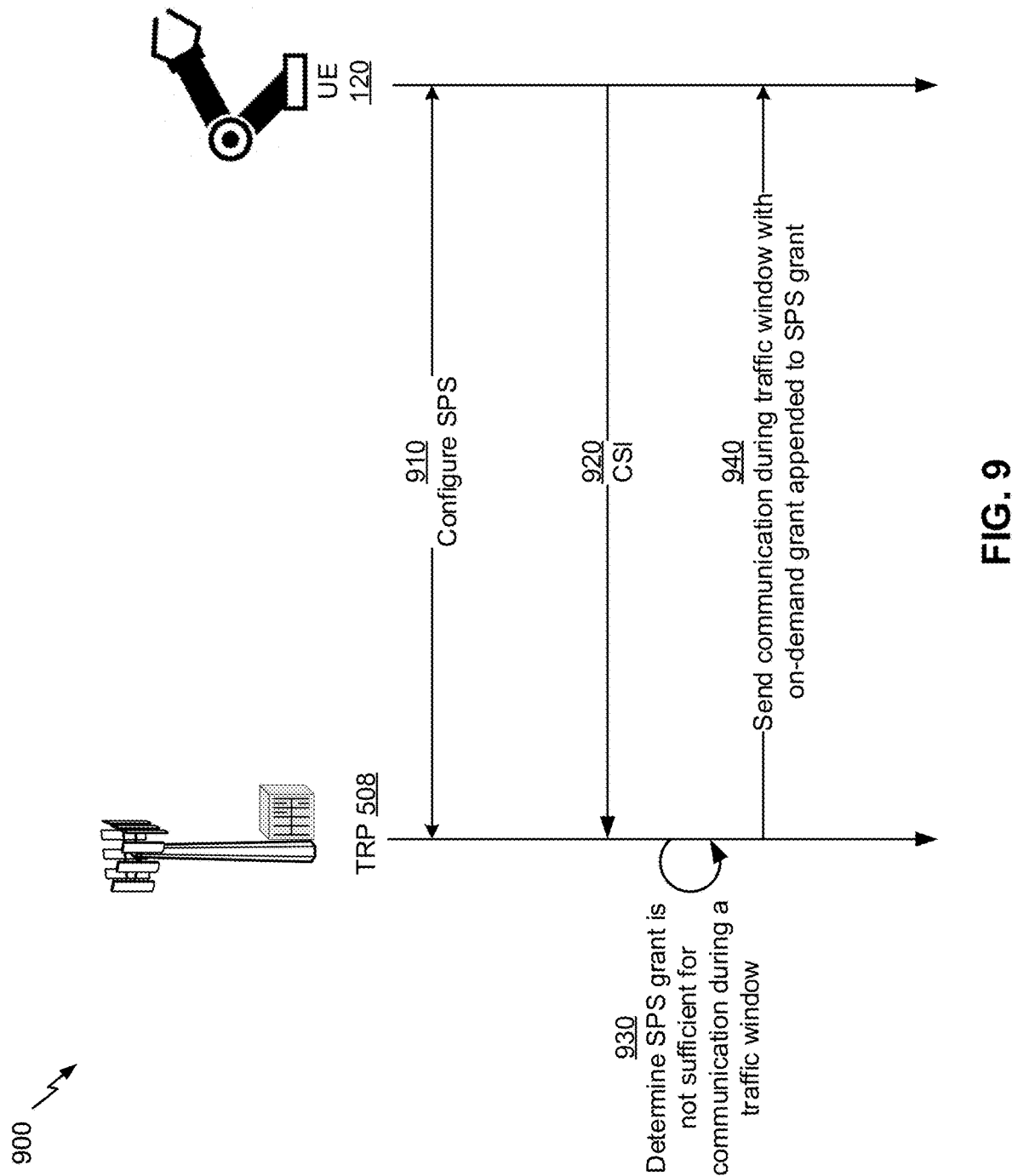
FIGS. 9 and 10 are diagrams illustrating examples of appending an on-demand grant to a semi-persistent scheduling (SPS) grant, in accordance with various aspects of the present disclosure.

FIG. 9 is a diagram illustrating an example 900 of appending an on-demand grant to an SPS grant, in accordance with various aspects of the present disclosure. The example 900 of FIG. 9 includes a TRP 508 and a UE 120 (shown as a robotic arm). In some aspects, UE 120 may periodically or aperiodically provide CSI to TRP 508. For example, the CSI may include an indication of strength of a channel between TRP 508 and UE 120. In some aspects, the strength of the channel may be affected by a position of the robotic arm of UE 120, due to an object or structure within a communication path between TRP 508 and UE 120, and/or the like. According to some aspects described herein, TRP 508 may efficiently allocate additional resources for a communication between TRP 508 and UE 120 based at least in part on the CSI. As described herein, in some aspects, TRP 508 may append an on-demand grant, indicated by an indicator or indication within the PDCCH, to an SPS grant when the CSI indicates that additional resources may be useful for the communication.

As shown in FIG. 9, and by reference number 910, TRP 508 and UE 120 configure SPS for communications between TRP 508 and UE 120. TRP 508 and UE 120 may use any suitable technique to configure SPS in accordance with some aspects of this disclosure. Therefore, according to the SPS configured between TRP 508 and UE 120, one or more traffic windows may be scheduled for communications between TRP 508 and UE 120. In some aspects, the traffic windows may include a plurality of communications. In some aspects, a first communication (e.g., an initial communication of one or more subsequent communications of the traffic window or a communication that occurs before any other subsequent communication during the traffic window) may include a transmission of data and subsequent communications and, e.g., if the first communication failed, may include retransmissions of the data. Additionally, or alternatively, subsequent communications to the first communication of the traffic window (or other communications of the traffic window) may include different data than the first communication (or other communications of the traffic window).

As further shown in FIG. 9, and by reference number 920, UE 120 provides the CSI to TRP 508. In some aspects, the CSI may correspond to a traffic-aware framework that is based at least in part on SPS of TRP 508 and UE 120. For example, UE 120 may be configured to send the CSI before (e.g., within a threshold period of time before) a scheduled traffic window for communications between TRP 508 and UE 120. Accordingly, the CSI may provide up-to-date information identifying conditions of the channel and/or identifying a state of the channel between TRP 508 and UE 120. Additionally, or alternatively, the CSI may be provided during scheduled traffic windows to include additional updates between communications of the traffic window.

As further shown in FIG. 9, and by reference number 930, TRP 508 determines whether an SPS grant is not sufficient for a communication during the traffic window. For example, for a first communication of a traffic window, TRP 508 may analyze the CSI, received from the UE 120, and determine that the SPS grant is not sufficient for the first communication (e.g., due to low reliability). More specifically, TRP 508 may determine that an amount of resources of the SPS grant does not satisfy a threshold reliability associated with the first communication. Notably, the term "SPS grant," as used herein, is defined to include SPS grants (e.g., as used for uplink and downlink communications in an LTE network), configured grants (e.g., as used for uplink communications in an NR network), and configured scheduling (e.g., as used for downlink communications in an NR network).

In some aspects, TRP 508 may perform an analysis (e.g., an analysis that utilizes scores, weights, and/or the like) of the CSI to determine the reliability for the communication. Additionally, or alternatively, TRP 508 may use one or more data structures (e.g., a table, a graph, an index, and/or the like) to determine the reliability of the communication based at least in part on the CSI. As such, TRP 508 may compare the reliability with the threshold reliability to determine whether the expected reliability satisfies the threshold reliability. When TRP 508 determines that the reliability, as indicated by the CSI, does not satisfy the threshold reliability, TRP 508 may determine that additional resources for the first communication may increase the reliability of the communication. For example, the TRP 508 may determine, based on a received CSI report, that poor channel conditions for a UE may suggest a lower modulation scheme or different modulation and coding scheme (MCS) to increase the reliability of a transmission and improve the chance that the UE will be able to decode the transmission. The lower modulation scheme for the transmission may, in turn, use more resources to carry the same amount of information, and the originally scheduled SPS resources may be insufficient to also include the additional resources used by the updated modulation scheme.

In some aspects, TRP 508 may determine a size of the communication in association with determining whether the SPS grant is not sufficient. In a case in which the communication is an uplink communication (e.g., a communication to be transmitted by UE 120), TRP 508 may determine a size of the communication based at least in part on information that identifies a fixed size for uplink communications. For example, in a given application (e.g., a factory automation application), a size (e.g., a packet size) for uplink communications may be fixed. Here, TRP 508 may store or have access to information that identifies the fixed size for uplink communications, and may determine whether the SPS grant is not sufficient for the uplink communication based at least in part on the information that identifies the fixed size and the CSI provided by UE 120.

In a case in which the communication is a downlink communication (e.g., a communication to be transmitted by TRP 508), TRP 508 may determine a size of the communication based at least in part on information that identifies a fixed size for downlink communication (e.g., when downlink communications have a fixed packet size in the given application) or based at least in part on a size of the particular downlink communication (e.g., when packet sizes of downlink communications can vary). Here, TRP 508 may determine whether the SPS grant is not sufficient for the downlink communication based at least in part on the determined size of the downlink communication (e.g., the fixed size or the size of the particular communication) and the CSI provided by UE 120.

As further shown in FIG. 9, and by reference number 940, TRP 508 sends a communication during the traffic window with an on-demand grant appended to the SPS grant. For example, for the first communication of the traffic window, TRP 508 may indicate that the on-demand grant for the communication is appended to the SPS grant using a resource of the PDCCH. As another example, TRP 508 may indicate that the on-demand grant for the communication is appended to the SPS grant via radio resource control (RRC) signaling, in an SPS activation message, and/or via another communication provided to UE 120. The example on-demand grant may be one or more resources of the PDSCH that is appended to the SPS grant. The SPS grant may also be included within the PDSCH. Accordingly, the on-demand grant is appended to the SPS grant in that the on-demand grant is allocated within a same subframe of the SPS grant for the first communication.

According to some aspects, the on-demand grant may be appended to the SPS grant in such a way that if the PDCCH is not successfully received, UE 120 may still receive the information according to the SPS grant. Accordingly, even if there is an error or failure associated with receiving the PDCCH, some of the data for the communication can be received via the SPS grant, as opposed to prior techniques that may override or replace the SPS grant with an allocation of resources of the PDSCH for the communication via the PDCCH. Put another way, by not overriding the SPS grant (i.e., by appending the on-demand grant instead of overriding), in a case in which the PDCCH associated with the on-demand grant is not successfully received, at least some of the data associated with the first communication (e.g., a portion of the data that was sent using the SPS grant) can be successfully communicated, and only data associated with the on-demand grant would require re-transmission. Thus, keeping the SPS grant available for the communication maintains one or more benefits of using SPS (e.g., reliability) and ensures that at least a portion of the data of the communication is communicated. In some aspects, if the communication that utilizes the SPS grant and on-demand grant fails, a retransmission may be communicated using any suitable techniques (e.g., using ACK/NACK feedback).

Accordingly, TRP 508 may allocate additional resources for a communication of a traffic window using on-demand grants that can be appended to SPS grants. As such, by appending on-demand grants to scheduled SPS grants, retransmissions of data of the communication may be lessened, conserving network resources, power resources, and/or processing resources associated with sending the retransmissions.

In some aspects, when the first communication is a downlink communication, TRP 508 may transmit the first communication using the SPS grant (e.g., a downlink SPS grant, a configured scheduling, etc.) and the on-demand grant (e.g., a downlink on-demand grant, etc.), and UE 120 may receive the first communication in resources of the SPS grant and/or the on-demand grant.

In some aspects, when the first communication is an uplink communication, UE 120 may transmit the first communication using the SPS grant (e.g., an uplink SPS grant, a configured grant, etc.) and the on-demand grant (e.g., an uplink on-demand grant, etc.), and TRP 508 may receive the first communication in resources of the SPS grant and/or the on-demand grant.

As indicated above, FIG. 9 is provided as an example. Other examples may differ from what is described with respect to FIG. 9.

Figure 10:
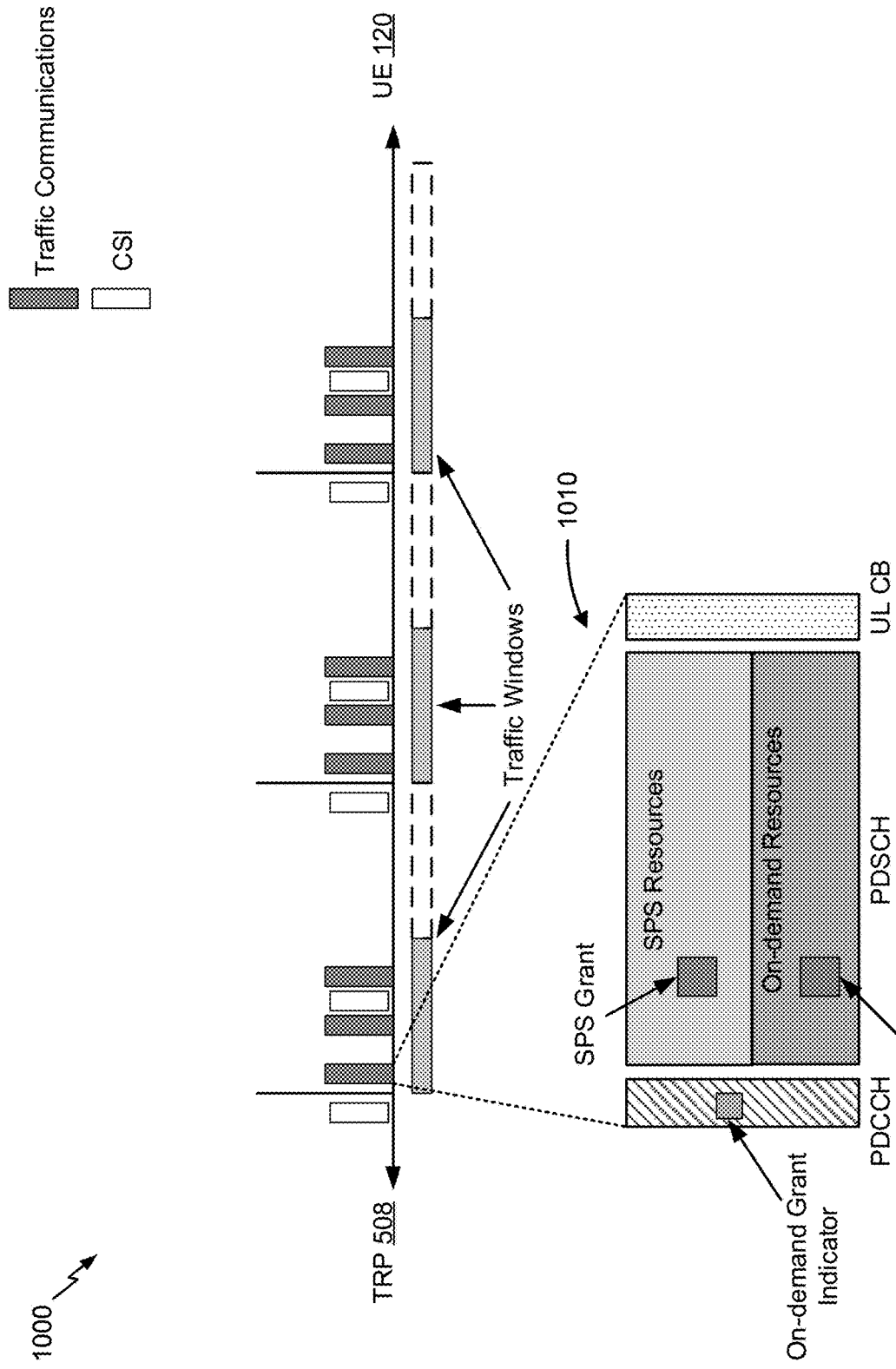

FIG. 10 is a diagram illustrating an example 1000 of appending an on-demand grant to an SPS grant, in accordance with various aspects of the present disclosure. Example 1000 of FIG. 10 includes an example of a communication stream between TRP 508 and UE 120. As further shown, an example subframe 1010 of a communication of one of the traffic windows of the communication stream is illustrated. In some aspects, the plurality of traffic windows may be scheduled according to SPS that is set up between TRP 508 and UE 120 (e.g., using any suitable technique). As shown in example 1000, CSI may be communicated prior to and during the traffic windows.

As shown in FIG. 10, a first communication of a traffic window includes subframe 1010 with a PDCCH, PDSCH, and UL common burst (CB) portion. In some aspects, the PDCCH, PDSCH, and UL CB portion may correspond to control portion 702, DL data portion 704, and UL short burst portion 706, respectively, as described above with respect to FIG. 7. The example PDSCH includes two pools of resources. The first pool of resources is designated for SPS resources and the second pool of resources is designated for on-demand resources. According to some aspects, TRP 508 may configure which resources of the PDSCH are to be designated as SPS resources and/or as on-demand resources. In some implementations, the PDSCH may include additional pools of resources (e.g., a pool of resources that may be SPS resources or on-demand resources).

In the first communication of the first traffic window of example 1000, the PDCCH includes an indication that an on-demand grant has been allocated for the communication. As such, the PDSCH of subframe 1010 includes both the SPS grant and the on-demand grant (such that the on-demand grant, which may include one or more on-demand resources, is appended to the SPS grant, which may include one or more SPS resources), which can be used to communicate data to UE 120. Accordingly, using subframe 1010, TRP 508 may efficiently allocate resources, in addition to an SPS grant, for a communication (e.g., based at least in part on the CSI) to ensure, or at least increase the likelihood relative to using only the SPS grant, that the data of the communication reaches UE 120.

As indicated above, FIG. 10 is provided as an example. Other examples may differ from what is described with respect to FIG. 10.

FIG. 11 is a diagram illustrating an example process 1100 performed, for example, by a BS, in accordance with various aspects of the present disclosure. Example process 1100 is an example method of wireless communication performed by a BS where a BS (e.g., BS 110, TRP 508) appends an on-demand grant to an SPS grant for a communication with a UE.

As shown in FIG. 11, in some aspects, process 1100 may optionally include determining that a semi-persistent scheduling (SPS) grant is not sufficient for a first communication of a traffic window, wherein the traffic window is scheduled for a user equipment (UE) using SPS (block 1110). For example, BS 110 (e.g., using transmit processor 220, TX MIMO processor 230, receive processor 238, controller/processor 240, and/or the like) may determine that the SPS grant is insufficient for sending the first communication. In some aspects, BS 110 may determine the SPS grant is insufficient based at least in part on being placed in communication with UE 120, based at least in part on receiving CSI, based on a traffic window for the first communication arriving, and/or the like.

As further shown in FIG. 11, in some aspects, process 1100 may include transmitting an indicator indicating that an on-demand grant is appended to a SPS grant for a first communication of a traffic window, wherein the on-demand grant is in a same subframe as the SPS grant (block 1120). For example, BS 110 (e.g., using transmit processor 220, TX MIMO processor 230, controller/processor 240, and/or the like) may transmit an indicator indicating that an on-demand grant is appended to a SPS grant for a first communication of a traffic window, wherein the on-demand grant is in a same subframe as the SPS grant. In some aspects, BS 110 may append the on-demand grant to the SPS grant based at least in part on determining that the SPS grant is not sufficient for sending the first communication.

Process 1100 may include additional aspects, such as any single aspect or any combination of aspects described below and/or in connection with one or more other processes described elsewhere herein.

In some aspects, the on-demand grant is indicated via a physical downlink control channel (PDCCH) resource. In some aspects, the SPS grant includes one or more resources of a pool of physical downlink shared channel (PDSCH) resources designated for SPS. In some aspects, the on-demand grant includes one or more resources of a pool of physical downlink shared channel (PDSCH) resources designated to be used on-demand in association with the SPS grant.

In some aspects, the subframe is coded to enable the SPS grant to be decoded regardless of whether an indicator, that the on-demand grant was appended to the SPS grant, was received by the UE. In some examples, this can be accomplished using systematic bits in the original SPS grant and additional parity check bits within the on-demand grant. The additional parity check bits within the on-demand grant can be in addition to parity check bits that are already in the original SPS grant.

In some aspects, the BS receives the first communication in resources of the SPS grant and resources of the on-demand grant. In some aspects, the BS transmits the first communication in resources of the SPS grant and resources of the on-demand grant.

In some aspects, the SPS grant is determined to not be sufficient for the first communication of the traffic window based at least in part on channel state information (CSI) received from the UE. In some aspects, the CSI indicates that an amount of resources of the SPS grant does not satisfy a threshold reliability associated with the first communication. In some aspects, the CSI is received before the traffic window. In some aspects, the CSI is received during the traffic window.

In some aspects, the BS and the UE are configured for use in a factory automation process. In some aspects, the first communication is an initial communication of one or more subsequent communications of the traffic window.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12A:
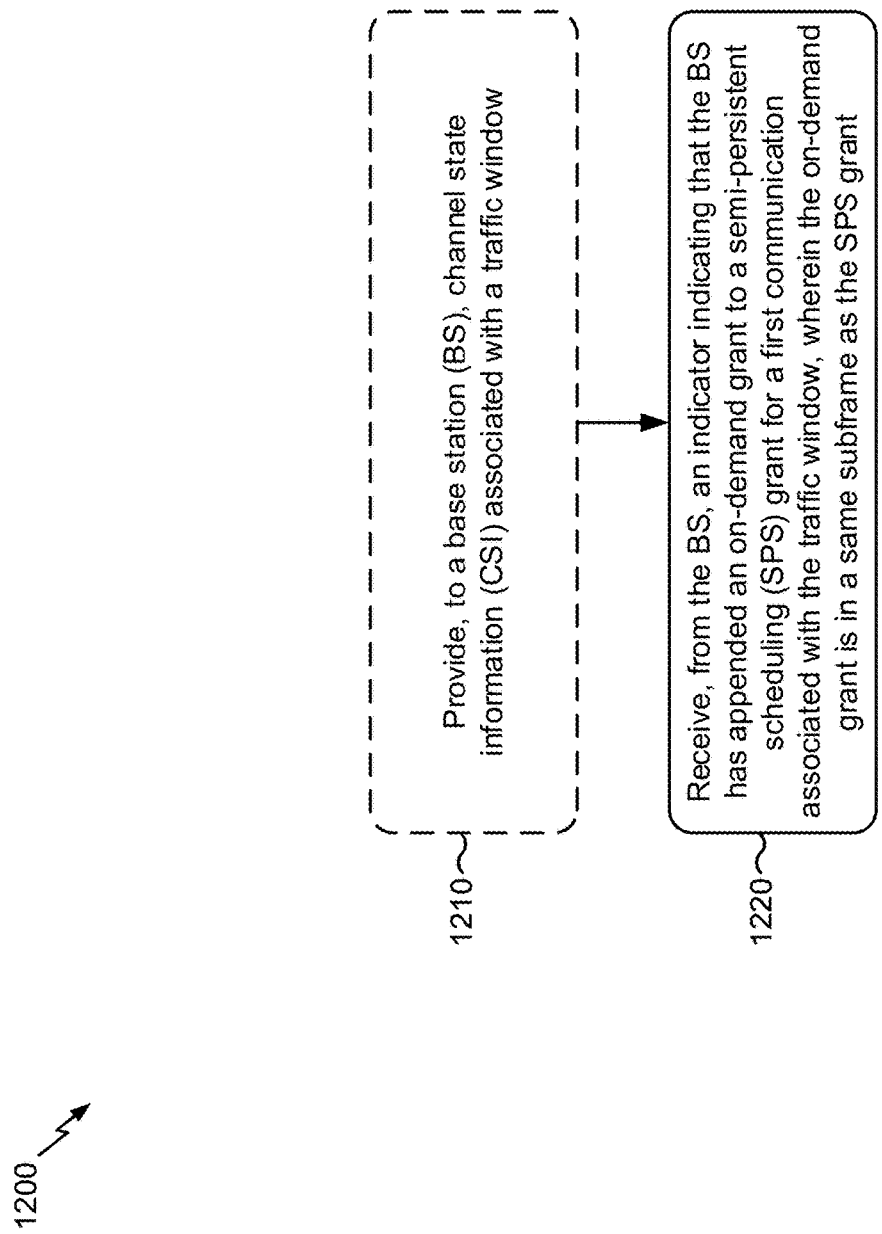
FIGS. 12A and 12B are diagrams illustrating example processes performed, for example, by a user equipment, in accordance with various aspects of the present disclosure.
Figure 12B:
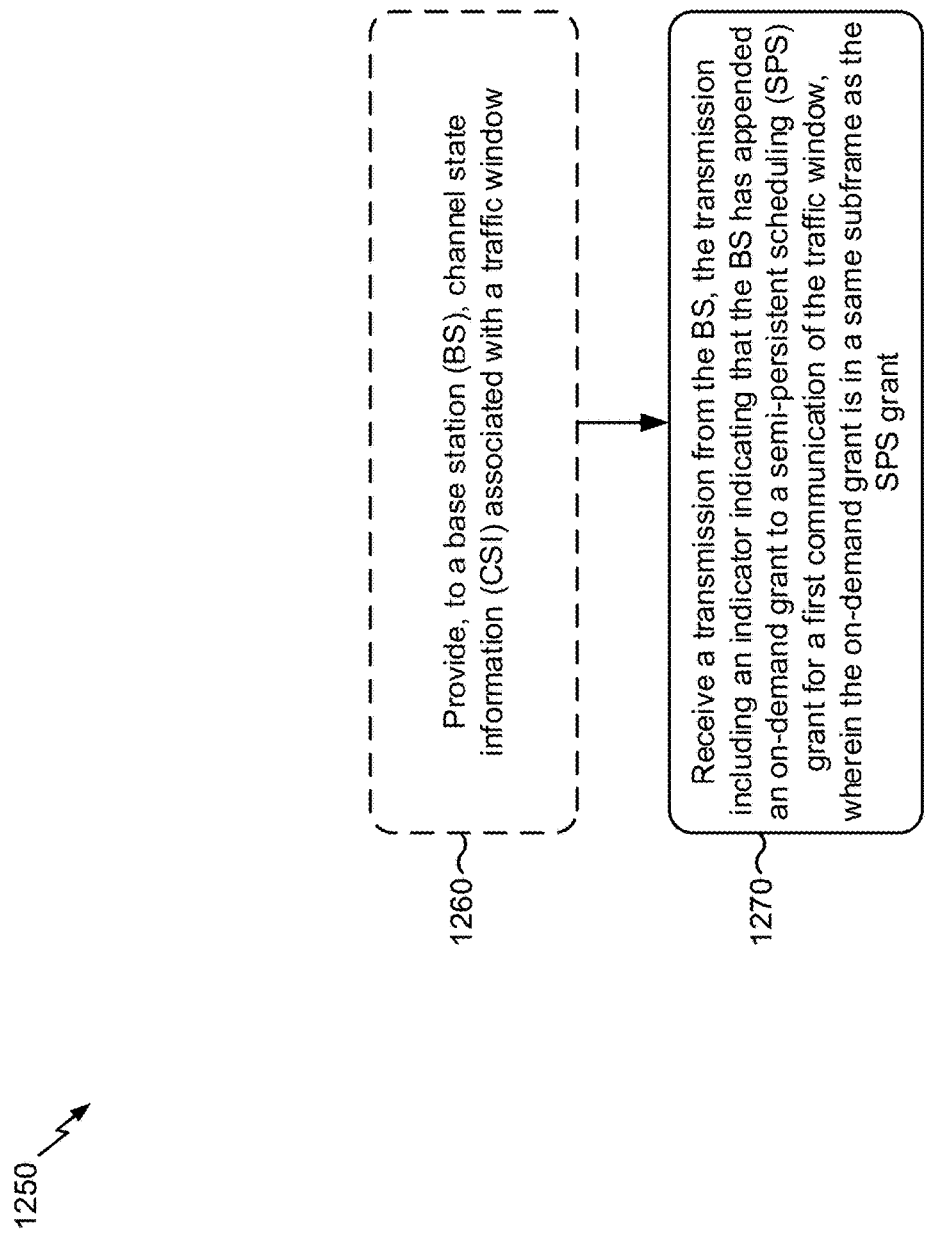

FIGS. 12A and 12B are diagrams illustrating example processes 1200 and 1250, respectively, performed, for example, by a UE, in accordance with various aspects of the present disclosure. Example processes 1200 and 1250 are example methods of wireless communication performed by a UE where a UE (e.g., UE 120) uses an on-demand grant appended to an SPS grant for a communication from a BS (e.g., BS 110, TRP 508, and/or the like).

As shown in FIG. 12A, in some aspects, process 1200 may optionally include providing, to a base station, channel state information (CSI) associated with a traffic window (block 1210). For example, UE 120 (e.g., using antenna 252, modulator 254, transmit processor 264, TX MIMO 266, controller/processor 280, and/or the like) may provide, to BS 110, the CSI associated with a traffic window. In some aspects, UE 120 may provide the CSI based at least in part on SPS, based on a configuration received from BS 110, based at least in part on determining the CSI, and/or the like.

As further shown in FIG. 12A, in some aspects, process 1200 may include receiving, from the BS, an indicator indicating that the BS has appended an on-demand grant to a SPS grant for a first communication associated with the traffic window (block 1220). For example, UE 120 (e.g., using antenna 252, demodulator 254, MIMO detector 256, receive processor 258, controller/processor 280, and/or the like) may receive, from BS 110, an indicator indicating that BS 110 has appended an on-demand grant to a SPS grant for a first communication associated with the traffic window. In some aspects, the on-demand grant is in a same subframe as the SPS grant. In some aspects, UE 120 may determine that the on-demand grant has been appended to the SPS grant based at least in part on providing the CSI, based at least in part on the CSI indicating that the SPS grant is not sufficient for the first communication, and/or the like.

Similarly, as shown in FIG. 12B, in some aspects, process 1250 may optionally include providing, to a base station, channel state information (CSI) associated with a traffic window (block 1260). For example, UE 120 (e.g., using antenna 252, modulator 254, transmit processor 264, TX MIMO 266, controller/processor 280, and/or the like) may provide, to BS 110, the CSI associated with a traffic window. In some aspects, UE 120 may provide the CSI based at least in part on SPS, based on a configuration received from BS 110, based at least in part on determining the CSI, and/or the like.

As further shown in FIG. 12B, in some aspects, process 1250 may include receiving a transmission from the BS, the transmission including an indicator indicating that the BS has appended an on-demand grant to an SPS grant for a first communication associated with the traffic window (block 1270). For example, UE 120 (e.g., using antenna 252, demodulator 254, MIMO detector 256, receive processor 258, controller/processor 280, and/or the like) may receive a transmission from BS 110, an indicator indicating that BS 110 has appended an on-demand grant to a SPS grant for a first communication associated with the traffic window. In some aspects, the on-demand grant is in a same subframe as the SPS grant. In some aspects, UE 120 may determine that the on-demand grant has been appended to the SPS grant based at least in part on providing the CSI, based at least in part on the CSI indicating that the SPS grant is not sufficient for the first communication, and/or the like.

Processes 1200 and/or 1250 may include additional aspects, such as any single aspect or any combination of aspects described below and/or in connection with one or more other processes described elsewhere herein.

In some aspects, the UE (e.g., UE 120) may transmit the CSI to the BS (e.g., BS 110) to enable the BS to determine whether or not the SPS grant satisfies a threshold reliability associated with the first communication.

In some aspects, the SPS grant includes one or more resources of a pool of physical downlink shared channel (PDSCH) resources designated for SPS. In some aspects, the on-demand grant includes one or more resources of a pool of physical downlink shared channel (PDSCH) resources designated to be used on-demand in association with the SPS grant.

In some aspects, the UE receives the first communication in resources of the SPS grant and the on-demand grant. In some aspects, the UE transmits the first communication in resources of the SPS grant and the on-demand grant. In some aspects, responsive to a determination that the on-demand grant has been appended to the SPS grant based on the indicator, the UE may communicate (e.g., receive or transmit) the first communication in resources of the SPS grant and/or the on-demand grant.

In some aspects, the CSI is provided before the traffic window. In some aspects, the CSI is provided during the traffic window.

In some aspects, the BS and the UE are configured for use in a factory automation process. In some aspects, the first communication is an initial communication of one or more subsequent communications of the traffic window.

Although FIGS. 12A and 12B show example blocks of processes 1200 and 1250, respectively, in some aspects, process 1200 and/or process 1250 may include additional blocks, fewer blocks, different blocks, or differently arranged blocks than those depicted in FIGS. 12A and 12B. Additionally, or alternatively, two or more of the blocks of process 1200 and/or process 1250 may be performed in parallel.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based at least in part on" unless explicitly stated otherwise.

What is claimed is:

1. A method of wireless communication performed by a base station (BS), comprising:
   determining that a semi-persistent scheduling (SPS) grant is not sufficient for a first communication of a traffic window based at least in part on channel state information (CSI) received from the UE;
   transmitting, in a physical downlink control channel (PDCCH) resource of a subframe, an indicator indicating that an on-demand grant is appended to the SPS grant for the first communication of the traffic window scheduled for a user equipment (UE) using SPS,
   wherein transmitting the indicator is responsive to determining that the SPS grant is not sufficient for the first communication of the traffic window; and transmitting, in a physical downlink shared channel (PDSCH) of the subframe, the on-demand grant and the SPS grant,
   wherein the on-demand grant is in a same subframe as the SPS grant.

2. The method of claim 1, further comprising: determining that the SPS grant is not sufficient for the first communication of the traffic window.

3. The method of claim 1, wherein the SPS grant includes one or more resources of a pool of PDSCH resources designated for SPS.

4. The method of claim 1, wherein the on-demand grant includes one or more resources of a pool of PDSCH resources, wherein the pool of PDSCH resources is designated to be used on-demand in association with the SPS grant.

5. The method of claim 1, wherein the subframe is coded to enable the SPS grant to be decoded regardless of whether the indicator was received by the UE.

6. The method of claim 1, Wherein the first communication is transmitted by the BS in resources of the SPS grant and the on-demand grant.

7. The method of claim 1, wherein the first communication is received by the BS in resources of the SPS grant and the on-demand grant.

8. The method of claim 1, wherein the CSI indicates that an amount of resources of the SPS grant does not satisfy a threshold reliability associated with the first communication.

9. The method of claim 1, wherein the CSI is received before the traffic window or is received during the traffic window.

10. The method of claim 1, wherein the BS and the UE are configured for use in a factory automation process.

11. The method of claim 1, wherein the first communication is an initial communication of one or more subsequent communications of the traffic window.

12. A method of wireless communication performed by a user equipment (UE), comprising: transmitting channel state information (CSI) to a base station (BS) to enable the BS to determine whether or not a semi-persistent scheduling (SPS) grant is sufficient for a first communication of a traffic window; receiving, from the BS and in a physical downlink control channel (PDCCH) resource of a subframe, an indicator indicating that the BS has appended an on-demand grant to the SPS grant for the first communication of the traffic window scheduled for the UE using SPS; and receiving, in a physical downlink shared channel (PDSCH) of the subframe, the on-demand grant and the SPS grant, wherein the on-demand grant is in a same subframe as the SPS grant.

13. The method of claim 12, further comprising providing channel state information (CSI) to the BS.

14. The method of claim 13, wherein the CSI is associated with the traffic window.

15. The method of claim 13, wherein the CSI is provided before the traffic window.

16. The method of claim 13, wherein the CSI is provided during the traffic window.

17. The method of claim 12, wherein transmitting the CSI to the BS to enable the BS to determine whether or not the SPS grant is sufficient for the first communication of the traffic window comprises transmitting the CSI to the BS to enable the BS to determine whether or not the SPS grant satisfies a threshold reliability associated with the first communication.

18. The method of claim 12, wherein the SPS grant includes one or more resources of a pool of PDSCH resources designated for SPS.

19. The method of claim 12, wherein the on-demand grant includes one or more resources of a pool of PDSCH resources, wherein the pool of PDSCH resources is designated to be used on-demand in association with the SPS grant.

20. The method of claim 12, further comprising receiving, from the BS, the first communication by the UE in resources of the SPS grant and the on-demand grant.

21. The method of claim 12, further comprising transmitting, to the BS, the first communication by the UE in resources of the SPS grant and the on-demand grant.

22. The method of claim 12, wherein the BS and the UE are configured for use in a factory automation process.

23. The method of claim 12, wherein the first communication is an initial communication of one or more subsequent communications of the traffic window.

24. A user equipment (UE) for wireless communication, comprising: memory; and one or more processors coupled to the memory, the memory and the one or more processors configured to: transmit channel state information (CSI) to a base station (BS) to enable the BS to determine whether or not a semi-persistent scheduling (SPS) grant is sufficient for a first communication of a traffic window; receive, in a physical downlink control channel (PDCCH) resource of a subframe, a transmission from the BS, the transmission including an indicator indicating that the BS has appended an on-demand grant to the SPS grant for the first communication of the traffic window scheduled for the UE using SPS; and receive, in a physical downlink shared channel (PDSCH) of the subframe, the on-demand grant and the SPS grant, wherein the on-demand grant is in a same subframe as the SPS grant.

25. The UE of claim 24, wherein the memory and the one or more processors configured to transmit the CSI to the BS to enable the BS to determine whether or not the SPS grant is sufficient for the first communication of the traffic window comprises the memory and the one or more processors configured to transmit the CSI to the BS to enable the BS to determine whether or not the SPS grant satisfies a threshold reliability associated with the first communication.

26. The UE of claim 24, the memory and the one or more processors further configured to, responsive to a determination that the on-demand grant has been appended to the SPS grant based on the indicator, receive the first communication in resources of the SPS grant and the on-demand grant.

27. The UE of claim 24, the memory and the one or more processors further configured to, responsive to a determination that the on-demand grant has been appended to the SPS grant based on the indicator, transmit the first communication in resources of the SPS grant and the on-demand grant.

28. An apparatus for wireless communication, comprising: means for transmitting channel state information (CSI) to a base station (BS) to enable the BS to determine whether or not a semi-persistent scheduling (SPS) grant is sufficient for a first communication of a traffic window; means for receiving, in a physical downlink control channel (PDCCH) resource of a subframe, an indicator indicating that the BS has appended an on-demand grant to the SPS grant for the first communication of the traffic window scheduled for the apparatus using SPS; and means for receiving, in a physical downlink shared channel (PDSCH) of the subframe, the on-demand grant and the SPS grant, wherein the on-demand grant is in a same subframe as the SPS grant.

29. The apparatus of claim 28, wherein the means for transmitting the CSI to the BS to enable the BS to determine whether or not the SPS grant is sufficient for the first communication of the traffic window comprises means for transmitting the CSI to the BS to enable the BS to determine whether or not the SPS grant satisfies a threshold reliability associated with the first communication.

\* \* \* \* \*